(12) United States Patent
Werst

(10) Patent No.: US 11,820,856 B2
(45) Date of Patent: Nov. 21, 2023

(54) POLYMERIC PLUGGING COMPOSITION

(71) Applicant: The Willamette Valley Company LLC, Eugene, OR (US)

(72) Inventor: Nathan E. Werst, Eugene, OR (US)

(73) Assignee: The Williamette Valley Company LLC, Eugene, OR (US)

( * ) Notice: Subject to any disclaimer, the term of this patent is extended or adjusted under 35 U.S.C. 154(b) by 218 days.

(21) Appl. No.: 16/499,631

(22) PCT Filed: Apr. 4, 2018

(86) PCT No.: PCT/US2018/025984
§ 371 (c)(1),
(2) Date: Sep. 30, 2019

(87) PCT Pub. No.: WO2018/187395
PCT Pub. Date: Oct. 11, 2018

(65) Prior Publication Data
US 2020/0040129 A1 Feb. 6, 2020

Related U.S. Application Data

(60) Provisional application No. 62/482,897, filed on Apr. 7, 2017.

(51) Int. Cl.
| | | |
|---|---|---|
| *C08G 18/76* | (2006.01) |
| *C08G 18/32* | (2006.01) |
| *C08G 18/65* | (2006.01) |
| *C09D 175/04* | (2006.01) |
| *E01B 31/24* | (2006.01) |
| *C08K 7/26* | (2006.01) |
| *C08G 18/08* | (2006.01) |
| *C08L 75/04* | (2006.01) |
| *C09J 175/04* | (2006.01) |

(52) U.S. Cl.
CPC ..... *C08G 18/7664* (2013.01); *C08G 18/3206* (2013.01); *C08G 18/6511* (2013.01); *C09D 175/04* (2013.01); *E01B 31/24* (2013.01)

(58) Field of Classification Search
None
See application file for complete search history.

(56) References Cited

U.S. PATENT DOCUMENTS

| | | | |
|---|---|---|---|
| 4,295,259 A | 10/1981 | Rhodes et al. | |
| 4,630,963 A * | 12/1986 | Wyman | C08G 18/0852 404/75 |
| 5,422,385 A | 6/1995 | Farkas | |
| 5,700,390 A | 12/1997 | Turnbach | |
| 5,952,053 A | 9/1999 | Colby | |
| 5,952,072 A * | 9/1999 | Colby | E01B 31/24 428/63 |
| 6,455,605 B1 | 9/2002 | Giorgini et al. | |
| 8,987,401 B2 | 3/2015 | Vyakaranam et al. | |
| 2008/0251594 A1 | 10/2008 | Stolarczyk et al. | |
| 2009/0008058 A1 | 1/2009 | Chaudhry et al. | |
| 2014/0148524 A1* | 5/2014 | Watanabe | C08G 18/6674 521/174 |
| 2014/0288198 A1* | 9/2014 | Awahara | C08J 9/30 521/56 |
| 2017/0136711 A1* | 5/2017 | Zhou | B29C 37/0067 |

FOREIGN PATENT DOCUMENTS

| | | | |
|---|---|---|---|
| CA | 1318735 C | 6/1993 | |
| CA | 2381872 A1 | 10/2002 | |
| EP | 2050782 A1 | 4/2009 | |
| WO | 2006033670 A2 | 3/2006 | |
| WO | 2013080787 A1 | 6/2013 | |
| WO | 2014082086 A1 | 5/2014 | |
| WO | WO-2015189045 A1 * | 12/2015 | ......... B29C 44/5681 |
| WO | 2017053064 A1 | 3/2017 | |

OTHER PUBLICATIONS

International Search Report, dated Jul. 9, 2018, for PCT/US18/025984 filed Apr. 4, 2018.
Supplementary European Search Report, dated Dec. 4, 2020, for EP Application No. 18780869.6 filed Oct. 30, 2019.
First Examination Report, dated Apr. 15, 2021, for IN Application No. 201917037915 filed Sep. 19, 2019.

* cited by examiner

*Primary Examiner* — Randy P Gulakowski
*Assistant Examiner* — Ha S Nguyen
(74) *Attorney, Agent, or Firm* — Crowell & Moring LLP

(57) ABSTRACT

A polymeric composition for restoring a previously formed spike hole in a wood railroad tie is described. The polymeric composition comprises a resin comprising a chain extender in a concentration of at least about 10 wt % and at least one polyol, and at least one isocyanate-containing compound. The chain extender may be diethylene glycol. The composition may also include a moisture control additive in a concentration of at least 5 wt % of the resin.

16 Claims, 7 Drawing Sheets ium Plugging Composition

POLYMERIC PLUGGING COMPOSITION

CROSS-REFERENCE TO RELATED APPLICATION

This application is a National Stage application of International Application No. PCT/US2018/025984, filed Apr. 4, 2018, which claims the benefit of U.S. Provisional Application No. 62/482,897, filed Apr. 7, 2017, the entire contents of which are hereby incorporated herein by reference.

BACKGROUND

1. Technical Field

This invention relates to a polymeric composition for restoring used railroad ties having pre-existing spike holes, and more particularly to a polymeric composition for plugging pre-existing spike holes in used railroad ties thereby forming restored railroad ties.

2. Background Information

Maintenance of the rails in railroad operations often involves repair of railroad ties. The railroad ties are typically structurally usable because they have not deteriorated to a point requiring replacement. However, reusing the ties can require restoring previously formed spike holes by plugging the holes with a material that enables firm anchoring of spikes within the spike hole.

Polymeric materials have been used to restore used railroad ties by plugging existing spike holes. The following U.S. patents describe the use of polymeric materials for this purpose: Method for Restoring Used Railroad Ties and the Restored Railroad Ties Formed Thereby (U.S. Pat. No. 7,632,557); Method for Restoring Used Railroad Ties and the Restored Railroad Ties Formed Thereby (U.S. Pat. No. 5,952,072); Process For Producing Filled Polyurethane Elastomers (U.S. Pat. No. 5,952,053), and Foamable Composition Exhibiting Instant Thixotropic Gelling (U.S. Pat. No. 6,455,605), all of which are incorporated herein by reference.

U.S. Pat. No. 5,952,072 (the "'072 patent") describes a polymeric composition comprising a substantially non-foaming, non-cellular polymeric material. Testing and analysis of the polymeric composition was performed in the '072 patent.

End users typically evaluate performance characteristics of polymeric plugging materials when determining which material to use. Performance characteristics can include the following non-exhaustive list: the force required to extract a spike from a spike hole filled with polymeric plugging material (spike withdrawal force); the force required to insert a spike into a spike hole filled with polymeric plugging material (spike insertion force); viscosity at relatively low temperatures (e.g., at or below −5° C.) and at relatively high temperatures (30° C.); moisture tolerance; and the amount of time it takes to reach final hardness. When formulating a composition, often components that improve performance of one characteristic tend to diminish performance of another characteristic. Thus, typically a polymeric plugging material will have good performance in one area, e.g., high spike withdrawal force, but less desirable performance in another area, e.g., viscosity.

It is desirable to provide a polymeric composition for plugging spike holes in used railroad ties that has good performance in multiple areas, e.g., high spike withdrawal force and relatively low viscosity at low temperatures. In this way, the polymeric composition would be more effective and user-friendly than currently available compositions. For example, it is desirable to have high spike withdrawal resistance without sacrificing the amount of time that the composition has to set after introduction to the hole before introducing a replacement spike. Additionally, it is desirable for the composition to have a rheological profile that enables relatively easy use and handling without having a long set time and without having a low spike withdrawal force. Further, it is desirable for the plugging composition to also be resistant to the formation of foam when applied in an aqueous environment.

BRIEF SUMMARY

In a first aspect of the invention, a polymeric composition for restoring a previously formed spike hole in a wood railroad tie, comprises a resin comprising a chain extender in a concentration of at least about 10 wt % and at least one polyol, and at least one isocyanate-containing compound.

In a feature of this aspect, the resin comprises between 10 wt % and 30 wt % chain extender. In another feature, the resin comprises between 10 wt % and 20 wt % chain extender. In a further feature, the chain extender comprises a low molecular weight diol. For example, the chain extender comprises diethylene glycol. In a still further feature, the at least one polyol comprises a polyalcohol having at least two hydroxyl groups. The at least one polyol may be selected from the group consisting of polyethers, polyesteramides, polythioethers, polycarbonates, polyacetals, polyolefins, polysiloxanes, various grades of caster oils, hydroxy-terminated prepolymers and mixtures thereof.

In another feature of the first aspect, the at least one isocyanate-containing compound comprises at least one isocyanate functional group selected from the group consisting of an aliphatic isocyanate, a cycloaliphatic isocyanate, an aryl isocyanate, an aromatic cyanate, and combinations thereof. In an additional feature, the at least one polyol is a mixture of more than one polyol.

In a second aspect of the invention, a polymeric composition for restoring a previously formed spike hole in a wood railroad tie, comprises a resin comprising diethylene glycol and at least one additional polyol, and at least one isocyanate-containing compound.

In a feature of this aspect, the resin further comprises at least two additional polyols. In a further feature, the resin comprises at least 5 wt % diethylene glycol. In a still further feature, the resin comprises between 5 wt % and 30 wt % diethylene glycol. For example, the resin comprises between 10 wt % and 20% diethylene glycol. In an additional feature, the at least one additional polyol comprises a polyalcohol having at least two hydroxyl groups. The at least one additional polyol may be selected from the group consisting of polyethers, polyesteramides, polythioethers, polycarbonates, polyacetals, polyolefins, polysiloxanes, various grades of caster oils, hydroxy-terminated prepolymers and mixtures thereof. In a further feature, the at least one isocyanate-containing compound comprises at least one isocyanate functional group selected from the group consisting of an aliphatic isocyanate, a cycloaliphatic isocyanate, an aryl isocyanate, an aromatic cyanate, and combinations thereof.

In a third aspect of the invention, a polymeric composition for restoring a previously formed spike hole in a wood railroad tie comprises a resin comprising at least one polyol and at least 5 wt % moisture control additive and at least one isocyanate-containing compound. In a feature of this aspect, the resin comprises between 5 wt % and 10 wt % moisture control additive. In a further feature, the resin comprises between 6 wt % and 8 wt % moisture control additive. In a still further feature, the moisture control additive comprises molecular sieves.

In a fourth aspect of the invention, a polymeric composition for restoring a previously formed spike hole in a wood railroad tie comprises a resin comprising at least one polyol and at least one isocyanate-containing compound, wherein the polymeric composition has a spike withdrawal resistance ratio of ≥0.9, wherein the spike withdrawal resistance ratio is the maximum force required to extract a railroad spike from the polymeric composition disposed in the previously formed spike hole divided by the maximum force required to extract a railroad spike directly from the same wood railroad tie, and wherein the polymeric composition has a viscosity of ≤70 Pa/s at temperatures as low as −20° C. and a shear rate of 1/s. In a feature of this aspect, the polymeric composition has a viscosity of ≤275 Pa/s at temperatures as low as −30° C. and a shear rate of 1/s.

In a fifth aspect of the invention, a polymeric composition for restoring a previously formed spike hole in a wood railroad tie comprises a resin comprising at least one polyol and at least one isocyanate-containing compound, wherein the polymeric composition has a spike withdrawal resistance ratio of ≥0.9, wherein the spike withdrawal resistance ratio is the maximum force required to extract a railroad spike from the polymeric composition disposed in the previously formed spike hole divided by the maximum force required to extract a railroad spike directly from the same wood railroad tie, and wherein the polymeric composition has a viscosity of ≤50 Pa/s at temperatures as low as −20° C. and a shear rate of 50/s.

In a feature of this aspect, the polymeric composition has a viscosity of ≤175 Pa/s at temperatures as low as −30° C. and a shear rate of 50/s. In a further feature, a polymeric composition for restoring a previously formed spike hole in a wood railroad tie comprises at least one polyol, wherein the polymeric composition has flowability at −5° C. of ≥1 gallon per minute. In an additional feature, the polymeric composition has flowability at −5° C. of ≥1.1 gallons per minute.

In a sixth aspect of the invention, a polymeric composition for restoring a previously formed spike hole in a railroad tie comprises a resin component, wherein the resin component comprises at least one polyol and a low molecular weight diol in a concentration of at least about 10 wt % relative to the total weight of resin component, and at least one isocyanate-containing compound, wherein the polymeric composition has a polyurethane index of less than or equal to 1.3. In a feature, the polyurethane index is less than or equal to 1.25.

In a seventh aspect, a polymeric composition for restoring a previously formed spike hole in a wood railroad tie comprises a resin comprising a low molecular weight diol in a concentration of at least about 10 wt % and at least one additional polyol, wherein the polymeric composition attains a hardness measurement that is at least 75% of final hardness at ambient temperature in less than 30 minutes. In a feature of this aspect, the polymeric composition attains a hardness measurement that is at least 75% of final hardness at ambient temperature at a time between 20 minutes and 30 minutes. In another feature, the polymeric composition attains a hardness measurement that is at least 75% of final hardness in less than 25 minutes. In an additional feature, the polymeric composition attains a hardness measurement that is at least 90% of final hardness at ambient temperature at a time between 30 minutes and 50 minutes. In yet another feature, the polymeric composition attains a hardness measurement that is at least 90% of final hardness at ambient temperature in less than 50 minutes. In a still further feature, the polymeric composition attains a hardness measurement that is at least 90% of final hardness at ambient temperature in less than 45 minutes.

DETAILED DESCRIPTION

Figure 1:
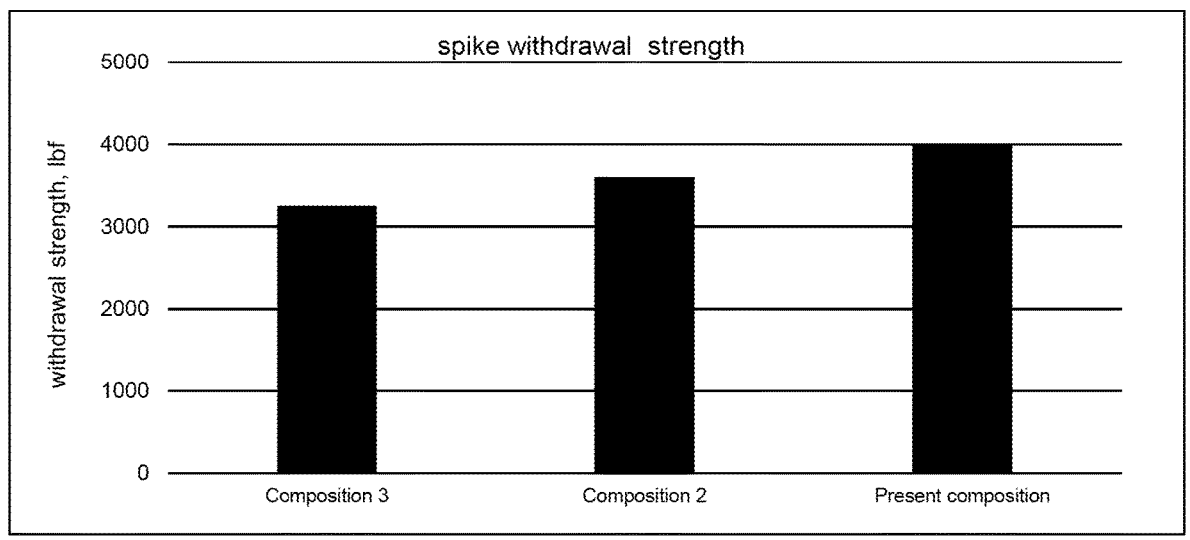
FIG. 1 is a chart comparing the maximum withdrawal forces for an exemplary embodiment of the present composition, Composition 2, and Composition 3.

A polymeric composition for repairing a wood railroad tie by restoring a previously formed spike hole in the wood railroad tie is described herein. After repair, the wood railroad tie with the restored spike hole can be reused. Because of ease of use and improved performance characteristics of the polymeric composition, wood railroad ties can be repaired in-situ and returned to service with excellent performance.

The polymeric composition comprises a resin component and an isocyanate-containing component, which react with one another when combined to form a solid or substantially non-cellular polymeric composition. Typically, the polymeric composition will be a polyurethane composition.

The resin component comprises a chain extender in a concentration of at least about 10 wt % and at least one polyol. The resin component may also comprise a moisture control additive in a concentration of at least about 5 wt %. The resin component may also comprise a wetting or dispersing agent, defoamer, a rheology modifier, catalyst, micro-balloons, compatibilizers, thixotropes, pigments, and anti-settling agents. The isocyanate-containing component comprises at least one isocyanate containing compound.

The polymeric composition typically has a density of greater than about 30 lb/ft$^3$, preferably greater than about 40 lb/ft$^3$, more preferably greater than about 50 lb/ft$^3$. For example, the density may be in a range from about 30 lb/ft$^3$ to about 120 lb/ft$^3$, preferably from about 50 lb/ft$^3$ to about 100 lb/ft$^3$, and more preferably from about 60 lb/ft$^3$ to about 90 lb/ft$^3$.

In the polymeric composition, the resin component includes at least one polyol. For the purpose of the present application, a "polyol" is an alcohol containing multiple hydroxyl groups available for reaction (that is, a multi-functional alcohol). A polyol having two hydroxyl groups is a diol, and a polyol having three hydroxyl groups is a triol. A polyol or polyol component is typically present in the resin component from about 5 wt % to about 100 wt % of the resin component. Suitably, the polyol may be present from about 20 wt % to about 50 wt %, preferably from about 30 wt % to about 50 wt %, and more preferably from about 35 wt % to about 45 wt % of the resin component. The resin component may comprise a single polyol or it may comprise a mixture of polyols. For example, the resin component may contain one polyol, two polyols, three polyols, or four or more polyols. In embodiments, the resin component may comprise a mixture of two or three polyols.

The polyols used in the resin component typically have a number average molecular weight from about 50 to about 8000. When employing a mixture of polyols, the various polyols of the mixture may have differing molecular weights. For example, a mixture of two polyols may include one polyol having a relatively lower molecular weight (e.g., about 500-1000 MW) and one polyol having a relatively higher molecular weight (e.g., about 2500-3500 MW). An exemplary mixture of three polyols may employ three polyols having differing molecular weights. For example, one polyol may have a molecular weight of about 400-500, the second may have a molecular weight of about 650-750, and the third may have a molecular weight of about 2500-3500. Polyol mixtures may also include a mixture of types of polyols. For example, a mixture of two polyols may include 2 diols, 2 triols, 1 diol and 1 triol, or a mixture of other types of polyols.

Useful polyols may include polyethers, polyesteramides, polythioethers, polycarbonates, polyacetals, polyolefins, polysiloxanes, various grades of caster oils, hydroxy-terminated prepolymers. For example, suitable polyols may include a polyol selected from the group consisting of a polyol with a hydroxyl-terminated backbone of a member selected from the group consisting of polyether, polyester, polycarbon, polydiene, and polycaprolactone; hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols, polyalkyleneether triols, adipic acid-ethylene glycol polyester, polybutylene glycol, polypropylene glycol and hydroxyl-terminated polybutadiene.

The resin component also comprises a chain extender in a concentration of at least about 10 wt % of the resin component. The relatively high concentration of chain extender affects the viscosity of the polymeric composition. The relatively high concentration of the chain extender, which typically has a relatively low molecular weight, tends to reduce to the viscosity of the polymeric composition. Suitable chain extenders may include polyol and amine chain extenders, for example, 1,4 butanediol, ethylene glycol, diethylene glycol, trimethylol propane, 2-ethyl-1,3-hexanediol, 1,6-hexanediol, cyclohexane dimethanol, and hydroquinone di(beta hydroxyethyl ether). The choice of chain extender can affect flexural, heat, and chemical resistance properties. The resin component may include a mixture of different chain extenders or may include a single chain extender. For example, the resin component may include a single chain extender (e.g., 1,4 butanediol or diethylene glycol) in a concentration of at least about 10 wt %, or the resin component may include a mixture of chain extenders (e.g., a mixture of polypropylene glycol with MW of 425, Vestamine® IPD, EPI-Cure™ 3271 and 2-ethyl-1, 3-hexanediol) as the chain extender in a total concentration of at least about 10 wt %. In an embodiment, the chain extender may comprise diethylene glycol.

The chain extender may be present in the resin component in a concentration ranging from about 10 wt % to about 30 wt %, preferably from about 10 wt % to about 20 wt %, and more preferably from about 10 wt % to about 15 wt %. Suitably, the chain extender may have a concentration of about 10 wt %, 11 wt %, 12 wt %, 13 wt %, 14 wt %, 15 wt %, 16 wt %, 17 wt %, 18 wt %, 19 wt %, and/or 20 wt % relative to the total weight of the resin component.

The concentration of chain extender in the present polymeric composition is higher than is typically present in commercially available polymeric plugging materials. Conventional wisdom holds that a higher concentration of chain extender leads to a lower spike withdrawal resistance for the polymeric plugging material. However, the present polymeric composition has both a relatively high chain extender concentration and a relatively high spike withdrawal resistance. Thus, the increased concentration of chain extender is not detrimental to the spike withdrawal force in the present polymeric composition.

In an exemplary embodiment, the chain extender is diethylene glycol. Using a relatively high concentration of diethylene glycol leads to performance advantages related to lower viscosity at relatively low temperatures, which will be discussed in greater detail below. For example, the relatively low viscosity of the polymeric composition at low temperatures allows the composition to be easily and efficiently transferred onsite from a bulk container to a transfer container being used to transfer the polymeric composition to the site for repair of railroad ties, even in cold weather conditions.

The resin component further comprises a moisture control additive. Suitable moisture control additives include moisture scavengers or desiccants such as silica gels, clays, calcium oxides, calcium sulfates, molecular sieves (synthetic zeolites), silanes, etc. The molecular sieves (zeolites) can be present in a concentration from about 0.5 wt % to about 10 wt % relative to the total weight of the resin component. Suitably, the molecular sieve may be present in a concentration of 0.5 wt %, 1 wt %, 2 wt %, 3 wt %, 4 wt %, 5 wt %, 6 wt %, 6.5 wt %, 7 wt %, 7.5 wt %, 8 wt %, 9 wt %, and/or 10 wt % relative to the total weight of the resin component. Further, molecular sieves may be present in a concentration range of about 3 wt % to about 10 wt %, preferably about 4 wt % to about 9 wt %, and more preferably about 6 wt % to about 8 wt %. The relatively high concentration of molecular sieve may provide increased moisture control tolerance for the present polymeric composition. The molecular sieve may have a size from about 1 angstrom to about 10 angstrom. For example, the molecular sieve may have a size of about 1 angstrom, 2 angstrom, 3 angstrom, 4 angstrom, 5 angstrom, 6 angstrom, 7 angstrom, 8 angstrom, 9 angstrom, and/or 10 angstrom. In a preferred embodiment, the molecular sieve has a size of about 3 angstrom.

In the resin composition, typically solid components comprise filler, pigment, and moisture control additive. The solids typically account for about 40% of the resin formulation. Filler and pigment are less costly than moisture control additive. Thus, from an economic perspective, it is desirable to use more filler and more pigment. Despite the increased cost, moisture control additives are included in polymeric plugging compositions because they provide an important function. Typically, moisture control additives are included in relatively low concentrations. For example, about 1-3 wt % of the resin component. In the present polymeric plugging composition, the moisture control additive is present in much higher concentrations than have conventionally been used. In the present composition, the moisture control additive may be present at concentrations from of about 5 wt % to about 10 wt % of the resin component. The performance advantage enabled by including a relatively high concentration of moisture control additive provides the incentive to use a higher concentration than has previously been used in polymeric plugging compositions.

The resin component may additionally incorporate diluents, fillers, compatibilizers, thixotropes, pigments, anti-settling agents, wetting/dispersing agents, defoamers, rheology modifiers, micro-balloons, and catalyst. Suitable fillers include barium sulfate, calcium sulfate, calcium carbonate, silica, and clay particles, such as aluminum silicates, magnesium silicates, ceramic and glass microspheres and kaolin. Suitable compatibilizers are hydroxy containing organic compounds, preferably hydroxy containing monocyclic arenes such as ethoxylated nonyl phenol, which compatibilize the polyol and aromatic diisocyanate reactants in the formulation. Suitable diluents include hydrotreated paraffinic oils, phthlates, carbonates, hydrotreated naphthenic oils, petroleum solvents, aliphatic solvents and propylene carbonate. Suitable wetting/dispersing agents include phosphoric acid esters, fatty acid chemistries, hyperbranched polymers, polyacrylates, polyurethanes, alkoxylates, sulfosuccinates, polyethersiloxanes, alkyl phenol ethoxylates, and other polymer blends. Suitable defoamers/deaerators include silicone oils, mineral oils, vegetable oils, polybutadienes, polyvinylethers, fluorocarbons, various surfactants, organomodified siloxanes including polyethers, polyesters, and other silicone containing polymers. Suitable rheology modifiers include natural and synthetic clays, organoclays, mineral colloids, silicates, organic castor derivatives, organic waxes, amides, fumed silicas, cellulose and cellulose derivatives. Suitable catalyst may include amine compounds and metal-based compounds. Exemplary metal compounds may include compounds based on tin, mercury, lead, bismuth, zinc. Exemplary amine compounds may include tertiary amines such as triethylenediamine (TEDA), dimethylcyclohexylamine (DMCHA), and dimethylethanolamine (DMEA).

Suitable micro-balloons may include polymeric micro-balloons, for example surface treated micro-balloons. The micro-balloons may be calcium carbonate coated polymeric micro-balloons. The micro-balloons can be provided in an amount up to about 3.0 wt %, preferably up to about 2.0 wt %, more preferably up to about 1.5 wt %, and most preferably up to about 1.0 wt %, based on the total weight of the resin component. Dualite® MS7000 flexible micro-balloons were employed in exemplary embodiments of the polymeric composition, which are described hereinbelow. The flexible and deformable micro-balloons aid in allowing spike insertion without spike bending and in retaining the spike after it has been inserted.

An exemplary formulation of the resin component of the present polymeric composition may be as follows: 30-50 wt % blend of high molecular weight polyfunctional alcohols, 10-20 wt % low molecular weight diol, 0.1-1.5 wt % surfactant and/or rheological modifier, 1-35 wt % inorganic pigment, 3-15 wt % moisture control additive, 0.1-1 wt % organometallic catalyst, and 0.1-5 wt % expanded polymer beads.

The resin component is reacted with the isocyanate-containing compound to form the polymeric composition, which is typically a polyurethane composition.

The isocyanate containing compound should have at least one isocyanate functional group. The functional group may be an aliphatic isocyanate, a cycloaliphatic isocyanate, an aryl isocyanate, an aromatic cyanate, or a combination thereof. The functional group may be 1,6-hexamethylene diisocyanate, 1,4-butylene diisocyanate, furfurylidene diisocyanate, 2,4-toluene diisocyanate, 2,6-toluene diisocyanate, 2,4'-diphenylethane, diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenze, 2,4-diisocyanate-s-triazine, 1-methyl-2,4-diisocyanato cyclohexane, p-phenylene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates or a combination thereof. In an exemplary embodiment, the preferred isocyanate functional group may be polymethylene polyphenyl polyisocyanates. The aforementioned list of isocyanate functional groups is representative of the isocyanate functional groups that may be used. However, the isocyanate functional groups suitable for use are not particularly restricted. U.S. Pat. No. 5,422,385, hereby incorporated by reference in its entirety, provides additional isocyanates that may be used.

When making the present composition, the volume ratio of resin component to isocyanate compound is generally about 2 to 1. The resin component can be compounded using a single-shaft dispersion mixer equipped with a disc-shaped blade approximately one-third the diameter of the containment vessel. The mixing can be carried out in open vessels without temperature or pressure controls, but should be protected from atmospheric contamination and ventilated to remove dust and fumes. After the resin is prepared, the resin component and isocyanate-containing compound can be mixed together to form the polymeric composition. It typically takes from about 10 minutes to about 90 minutes of mixing to form the polymeric composition.

The present polymeric composition provides a combination of advantageous properties that are not found in currently commercially available products. The polymeric composition provides superior spike holding power and spike withdrawal resistance while also providing rheological benefits such as superior flowability at low ambient temperatures. Additionally, the polymeric composition has a faster hardness build than currently available products and provides improved moisture tolerance. For example, the polymeric composition is more resistant to the formation of cellular material or undesirable reaction products when applied in an aqueous environment than currently available plugging compositions.

Spike withdrawal resistance or withdrawal force is a performance measurement that indicates the holding ability of a filler material to anchor a spike to a railroad tie. The spike withdrawal resistance indicates the amount of force required to remove a spike from the polymeric filler material. Analysis can be performed by removing a spike from filler material using a high capacity mechanical tester that can accurately measure the force being placed on the spike.

When taking these measurements, the maximum force recorded just before the spike begins to move outwardly from the filler material is reported as the withdrawal strength or withdrawal force. Conversely, the spike insertion force can also be measured. A spike is inserted into the filler material at a steady rate up to a predetermined depth. The maximum load recorded during insertion is reported as the spike insertion force. Advantageously, although the polymeric composition has high spike withdrawal resistance and a high spike insertion force, it does not cause spike bending upon insertion thereof into the polymeric composition. Rather, the polymeric composition enables a spike to be inserted without bending and then retains the spike with improved spike withdrawal resistance.

A spike withdrawal resistance ratio for a polymeric composition can be determined using the measured spike withdrawal force for that composition. As indicated above, the spike withdrawal force is the maximum force required to extract a railroad spike from a polymeric composition. The maximum force required to extract a railroad spike from the same crosstie in a previously un-spiked location (i.e., a new hole) in wood alone can also be measured. The spike withdrawal resistance ratio is the spike withdrawal force for the polymeric composition divided by the maximum force required to extract the spike from the same crosstie from a new hole in the wood alone. The polymeric plugging composition described herein has a spike withdrawal resistance of ≥0.8, more preferably ≥0.85, even more preferably ≥0.9, and most preferably ≥0.95.

When measuring a spike withdrawal resistance ratio, some factors to consider include spike type (for example, ⅝" square, 6½" length, and/or steel cut spikes), tie wood type, spike insertion depth (for example, 4.5" or full depth), spike hole geometry (for example shape, dimensions, and depth), time and temperature/humidity conditions between plugging compound application and spike insertion, time and temperature/relative humidity conditions between spike insertion and extraction, number of spikes tested, and insertion and extraction test rate (inches/min).

Additionally, testing can be performed to determine the strength of a polymeric plugging composition after a period of use. For example, fatigued extraction and rollover testing can be performed. In this regard, tests that are familiar to one of ordinary skill in the art are fatigued extraction and rollover tests after 3,000,000 cycles, which are performed according to AREMA chapter 30, section 2.7, test 6. The AREMA test is described in more detail below in the Examples section.

The rheological profile of the polymeric composition can also improve its performance. The present polymeric composition has a lower viscosity than commercially available polymeric filler materials having relatively high spike withdrawal resistance, even at relatively low temperatures. As such, the spike withdrawal resistance is not diminished or sacrificed to attain low viscosity at low ambient temperatures. Suitably, the viscosity of the polymeric composition at a temperature of −30° C. may be less than or equal to about 275 Pa*s at a shear rate of 1/s. In comparison, currently available commercial material with relatively high withdrawal resistance has a viscosity at −30° C. of greater than 800 Pa*s at a shear rate of 1/s and >400 Pa*s at a shear rate of 50/s.

The lower viscosity enables the polymeric composition to be transferred from a storage container more quickly thereby reducing overall repair time. For example, in preferred embodiments, the present composition can be transferred at a rate of ≥1 gallon/minute (gpm), more preferably ≥1.1 gpm, even more preferably ≥1.15 gpm, and most preferably ≥1.2 gpm.

The lower viscosity also reduces wear on application equipment thereby lowering operating costs and increasing efficiency. Additionally, the polymeric composition is better able to penetrate and fill spaces and defects in the tie near the spike hole. Reduced viscosity also aids in improved storage stability and handling because the thinner composition flows more readily and is thus easier to use.

Further, the rheological profile of the polymeric composition reduces the temperature at which trace line heating is needed. Currently, trace lines are typically activated for temperatures lower than about 80° F. Typically, trace line temperatures are set for about 90-120° F. In contrast, with the polymeric composition described herein, trace lines are not needed until temperatures are below about 60° F., preferably below about 50° F., most preferably below about 40° F. The reduced need for heating lines enables a longer working/repair season without the use of heating lines, thus reducing overall repair and operating costs.

The polymeric composition also exhibits a lower polyurethane index than currently available polymeric plug materials that have a relatively higher holding power (Composition 2). The polyurethane index is the ratio of functional equivalents of isocyanate to functional equivalents of alcohol. A lower polyurethane index offers additional resistance to the effects of moisture. When the polymeric composition comes into contact with water, available isocyanate functional groups react with water to produce $CO_2$ and foam. Thus, having fewer available isocyanate functional groups reduces foam formation, which is beneficial. Foam formation may be evaluated by visual inspection. Advantageously, the polyurethane index of the polymeric composition may be approximately equal to or lower than about 1.3, preferably equal to or lower than about 1.25, and more preferably equal to or lower than about 1.2. For example, the urethane index for the present polymeric composition may be from about 1.0 to about 1.3. The urethane index for Composition 2 (described below) is between 1.4 and 1.5.

The present polymeric composition also exhibits faster time to hardness than conventional compositions. Faster time to hardness can provide economic and efficiency benefits. The present polymeric plugging material reaches 75% of final hardness (at 21° C., 70° F.) faster than conventional commercially available plugging materials. The ability of the polymeric plugging material to develop hardness and other mechanical properties faster than other commercially available compositions is advantageous. It may reduce the amount of time from when the polymeric composition is introduced to the hole to when a spike may be effectively inserted into the spike hole. It may also reduce the cure time required before Kribber Adzer cutting machine (for example, as little as 5-10 minutes at 21° C., 70° F.). As one of ordinary skill in the art would appreciate, without sufficient time for hardness to develop, the Kribber Adzer machine that follows immediately after the application of plugging composition can damage and potentially pull out the plugging composition instead of cutting it smoothly with the rail seat area. Plugging materials with slow hardness/property build characteristics are particularly vulnerable to Adzer damage. Faster time to hardness can also enable faster return to service.

Performance analysis comparing the present polymeric composition to comparator polymeric plugging materials was performed. Properties for the herein described polymeric composition were compared with those of comparison plugging materials in side by side testing. Two commercially available compositions were tested for comparison. The formulations for the resin portion of the compositions are provided in Table 1. The formulation in the column labeled Polymeric Plugging Composition indicates an exemplary formulation for the polymeric plugging composition described herein. Commercial compositions 2 and 3 represent currently available commercial products.

TABLE 1

|  | Present composition wt % | commercial comp 2 wt % | commercial comp 3 wt % |
|---|---|---|---|
| Polyol Blend (400-3000 MW) | 40-45 | 40-55 | 45-55 |
| Chain Extenders (<400 MW diols) | 10-15 | 3-5 | 7-15 |
| polyamine | none | none | 1-5 |
| surfactants (wetting/dispersing aids, air release agents) | ≤1 | ≤1 | ≤1 |
| rheological modifiers | 1-5 | 1-5 | 1-5 |
| filler/extender pigments | 30-35 | 35-55 | 20-40 |
| coloring pigments | ≤2 | ≤2 | ≤2 |
| moisture scavenger (molecular sieve) | 7-8 | 1-3 | 1-3 |
| reaction catalysts | ≤1 | ≤1 | ≤1 |
| micro balloons | ≤2 | ≤2 | ≤2 |

Example 1

Exemplary formulations of the polymeric materials being tested were produced for use in the performance evaluations. A single shaft dispersion mixer equipped with a disc-shaped high shear blade approximately one-third the diameter of the containment vessel was used to compound the resin component. The resin component was then mixed with the isocyanate compound to form the polymeric composition. The isocyanate compound used for all exemplary polymeric materials was polymeric methylene diphenyl diisocyanate (pMDI or "polymeric MDI"), mixed at a ratio of 2 parts resin to 1 part isocyanate compound by volume.

The formulations for polymeric materials used in the Examples are shown in Table 1 above. The chain extender in the exemplary embodiment of the present polymeric composition was diethylene glycol. In the present composition, diethylene glycol should be included at a concentration of at least about 10 wt % of the resin composition.

Example 2

Spike insertion force and spike withdrawal force for the herein described polymeric composition was compared with that of two comparison plugging materials in side by side testing: Composition 2 and Composition 3.

Spike insertion and withdrawal strength were evaluated using a method derived from a method detailed in BNSF Crosstie Qualification Testing Procedure 04/03/00 Revision. A section of untreated wood crosstie was drilled out with a series of 2 inch diameter by 5 inch depth holes. The holes were filled with the four compositions, which were dispensed via 450 mL, 2:1 volume ratio cartridges through static mixers. The compositions were allowed to cure for 20-30 minutes at ambient lab conditions. These conditions simulate field conditions as 20-35 minutes is the minimum cure time for realistic field conditions. Each of the cured polymeric plugs was placed under the crosshead of a high capacity mechanical tester, and a standard cut spike (5.8 in.×5.8 in. cross-section×6 in. length) was positioned over and lowered into the plug at a rate of 2 inches/min to a depth of 4.5 inches. The mechanical tester was a 600 kN capacity universal testing instrument from Instron, model #5989 with custom fabricated hardware designed specifically for spike insertion and withdrawal.

The reported insertion strength was the maximum load recorded by the instrument during insertion. The compositions cured for 20-24 hours at ambient lab conditions, and then the spikes were withdrawn from the plugs at a pull rate of 2 inches/min using the same instrument equipped with a spike withdrawal fixture. The maximum force recorded as the spike was withdrawn was reported as withdrawal strength.

The same type wood and the same conditions were used for each composition. Tests were performed for four to six spike holes per composition.

The results of the insertion and withdrawal testing are shown in Table 2 below.

Table 2. Maximum insertion and withdrawal forces (lbf) for insertion times from 20-40 minutes for the present composition are compared to Composition 2 and Composition 3. The present composition exhibited better spike withdrawal resistance in the form of maximum average withdrawal force in comparison to Composition 2 and Composition 3.

TABLE 2

| Composition | insertion time, minutes | insertion (lbf) | cure time, hours | withdrawal (lbf) |
|---|---|---|---|---|
| Composition 3 | 20-35 | 3960 | 24 | 3250 |
| Composition 2 | 19-32 | 5860 | 20 | 3603 |
| Polymeric plugging composition (current) | 20-35 | 6360 | 24 | 4010 |

As can be seen in the above table, the present composition had a higher average maximum insertion force and a better average maximum withdrawal force than Composition 2 and Composition 3. These results are graphically shown in FIG. 1.

Example 3

Additional testing was performed to evaluate the spike insertion force and spike withdrawal force for the present composition in comparison to Composition 3. The same methodology used in Example 1 was used in this Example.

The compositions were allowed to cure for 30 minutes at ambient lab conditions prior to spikes being inserted therein. This cure time was used to mimic the timeline of field application on a live railroad repair operation. Spike withdrawals were performed after overnight ambient cure.

In addition, spike withdrawal force was measured for a spike directly inserted into and then removed from the same wood tie as the relevant composition. One wood tie was used for testing the exemplary polymeric plugging composition, and a different wood tie was used for testing Composition 3. Thus, the spike withdrawal force for a spike removed directly from the wood tie was measured for each wood tie. The average results are shown in Table 3 below.

TABLE 3

Maximum Insertion and Withdrawal Force (lbf) after 20-40 minute insertion cure time (for plugging compositions)

| Composition | Insertion (lbf) | Withdrawal (lbf) | SWR ratio |
|---|---|---|---|
| Polymeric plugging composition | 10567 | 9022 | 0.96 |
| Composition 3 | 6881 | 4295 | 0.49 |
| Wood tie used for polymeric plugging composition | 9828 | 9416 | NA |
| Wood tie used for Composition 3 | 8684 | 8754 | NA |

A spike withdrawal resistance ratio was determined for each composition. The spike withdrawal force for each composition was measured. The maximum force required to extract a railroad spike from the same crosstie in a previously un-spiked location (i.e., a new hole) in wood alone was also measured. The spike withdrawal resistance ratio (SWR ratio) is the spike withdrawal force for the composition divided by the maximum force required to extract the spike from the same crosstie from a new hole in the wood alone. As shown in Table 3, the SWR ratio for the exemplary polymeric plugging composition was much higher than (nearly double) that for Composition 3. Additionally, as can be seen in Table 3, the present composition had a higher average maximum withdrawal force than Composition 3.

Example 4

Fatigue and rollover testing was also performed to compare the present polymeric plugging composition to Composition 3. The fatigued extraction and rollover testing was performed after 3,000,000 cycles according to AREMA chapter 30 section 2.7 test 6. Generally speaking, the AREMA (2011) Chapter 30 section 2.7 test 6 requires a cyclic, repeated load test for a total of 3 million cycles under different temperature conditions (that is, room, cold and hot temperatures).

The wood ties were inspected to identify potentially serious defects prior to testing. Plates were fastened to the tie per manufacturer's specifications using the appropriate hold down devices. The present polymeric plugging composition and Composition 3 were inserted into the spike holes in their individual wood ties prior to spike insertion. As with the above test, each composition was tested in a different wood tie. Spikes were inserted 20 to 30 minutes after casting of the compositions.

Rails were positioned and fastened in place. The tie was measured and marked accordingly. Digital transducers were placed at both ends of the rail, positioned horizontally at the head and base to record displacements. To simulate an abrasive environment for each rail seat, water drippers were placed directly over the field side and gauge side of the rail seat and sand was sprinkled regularly. The water drippers were set to provide a continuous 1.25 ounces (+/−0.25) of water per hour.

A 65,000 lbs$_f$ load was applied using a servo-controlled vertical actuator and two (2) load arms angled at approximately 27.5 degrees (±1 degree). Consequently, the load distribution per rail seat was 32,500 lbs$_f$ vertically and 16,900 lbs$_f$ laterally with an L/V ratio=0.52.

Initially, a static load was applied to settle the assembly and to obtain baseline values for head and base displacements. Repeated load (fatigue) testing was initiated for a total of 3,000,000 cycles at 2.5 hertz in varying temperature environments.

Temperature environments were simulated on each rail seat following the cold temperature/room temperature/hot temperature cycle schedule identified in the AREMA test 6 specification.

All components were visually inspected periodically, without disassembly, for any signs of damage or wear.

After the fatigue test, spike extraction was performed on one side of the wood ties. Rollover testing was performed on the opposite side of the wood ties.

Figure 2:
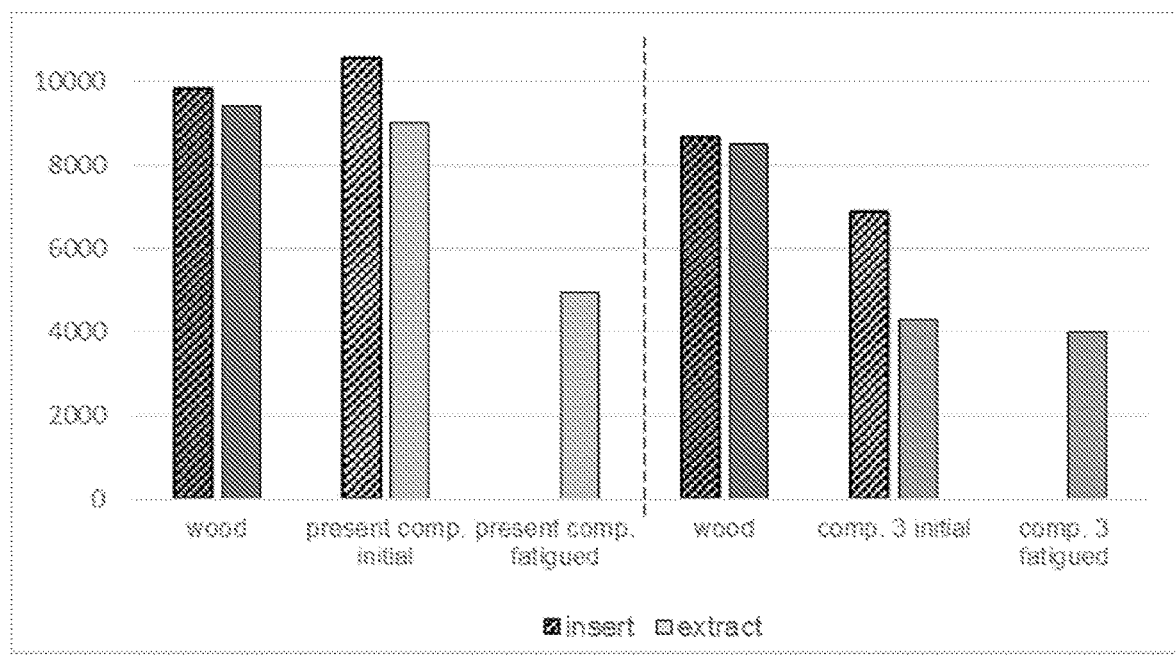
FIG. 2 is a chart comparing the maximum insertion and withdrawal forces for an exemplary embodiment of the present composition, Composition 3, and a wood tie. Additionally, the maximum withdrawal force for the exemplary present composition and Composition 3 are shown after the wood tie containing the plugging composition has been fatigued.

The averaged results of the fatigue testing and rollover testing are shown in Table 4. Graphical results for Example 3 are Example 4 are shown in FIG. 2.

TABLE 4

| Composition | Extraction Force (lbf) | Rollover Force (lbf) |
|---|---|---|
| Polymeric plugging composition (current) | 4942 | 6554 |
| Composition 3 | 3991 | 5924 |

Example 5

Figure 3:
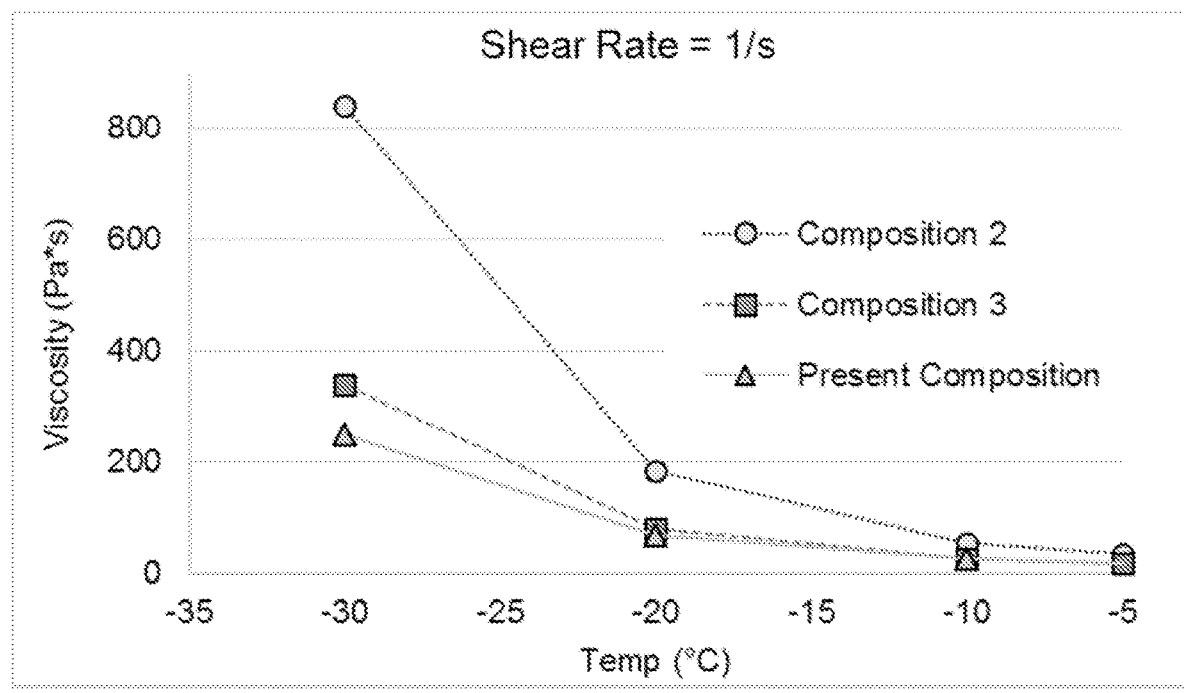
FIG. 3 is a graph showing viscosity vs. temperature curves for Composition 2, Composition 3, and an exemplary embodiment of the present composition at a shear rate of 1/s.
Figure 4:
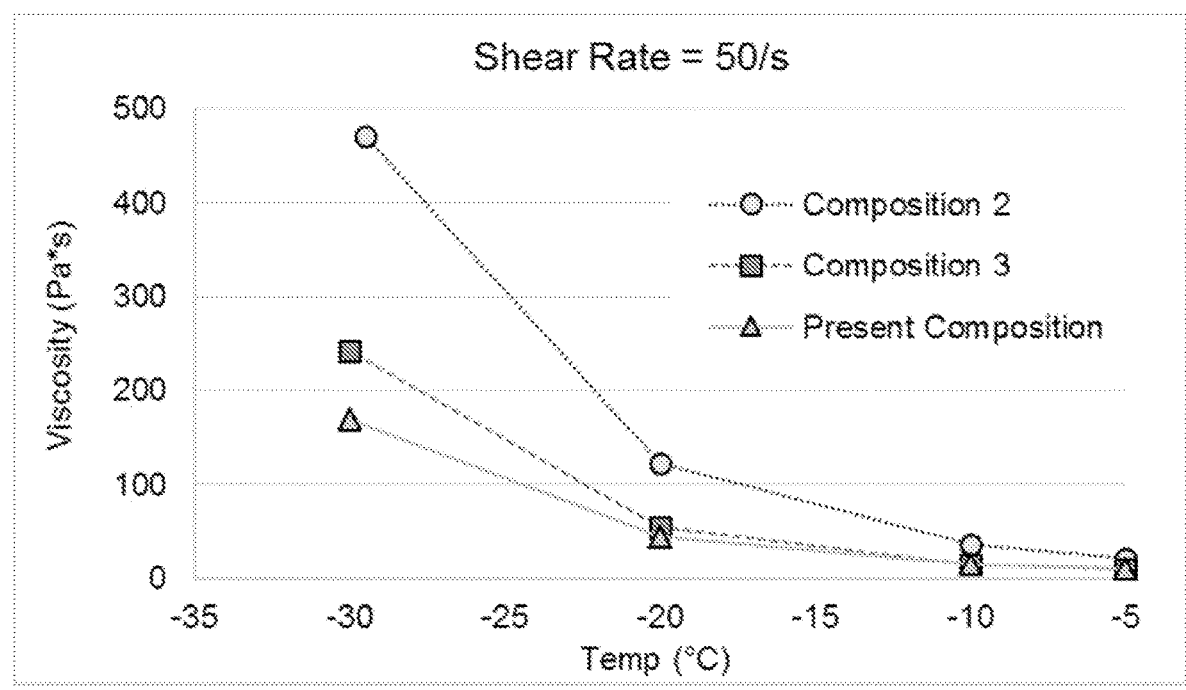
FIG. 4 is a graph showing viscosity vs. temperature curves for Composition 2, Composition 3, and an exemplary embodiment of the present polymeric plugging composition at a shear rate of 50/s.

The viscosity of the herein described polymeric composition was compared with the viscosities of Composition 2 and Composition 3 in side by side testing. A temperature-controlled rheometer, namely, a TA Discovery HR-1, was used to measure the viscosity of the compositions being evaluated. Analysis was performed using 25 mm parallel plate geometry at a temperature range from 25 to −30° C. at shear rates of 1/s and 50/s. FIG. 3 and FIG. 4 are graphical illustrations showing results of the viscosity analysis across the temperature range of −5 to −30° C. at 1/s shear rate and 50/s shear rate, respectively. As can be seen, the viscosity of the presently described polymeric composition is significantly less than the viscosity of Composition 2 for the temperature range below −10° C. For Composition 3, the viscosity of the presently described polymeric composition is similar to that of Composition 3 until about −10° C. and then is less than that of Composition 3 at temperatures lower than about −10° C. Table 5 provides results of viscosity testing for the temperature range of 25 to −30° C. As shown in Table 5, the viscosity of the presently described polymeric plugging composition is less than that of Composition 2 at all temperatures. The viscosity of the presently described polymeric plugging composition is similar to that of Composition 3 until a temperature of about −10° C. and then is less than the viscosity of Composition 3 at temperatures below about −10° C.

TABLE 6

Viscosity at 25° C. to −30° C. at shear rate 1/s and 50/s

| | Temp. ° C. | Composition 2 Viscosity Pa · s | Composition 3 Viscosity Pa · s | Polymeric plugging composition Viscosity Pa · s |
|---|---|---|---|---|
| Shear rate 1/s | 25 | 13.4 | 9.1 | 5.4 |
| | 5 | 19.9 | 11.3 | 10.4 |
| | −5 | 34.7 | 17.9 | 18.2 |

TABLE 6-continued

Viscosity at 25° C. to −30° C. at shear rate 1/s and 50/s

|  | Temp. ° C. | Composition 2 Viscosity Pa·s | Composition 3 Viscosity Pa·s | Polymeric plugging composition Viscosity Pa·s |
|---|---|---|---|---|
|  | −10 | 53.3 | 26.0 | 25.9 |
|  | −20 | 183.4 | 79.1 | 67.8 |
|  | −30 | 842.2 | 339.3 | 249.6 |
| Shear | 25 | 2.1 | 1.1 | 1.3 |
| rate 50/s | 5 | 8.4 | 3.9 | 4.4 |
|  | −5 | 21.4 | 9.7 | 10.1 |
|  | −10 | 36.5 | 16.1 | 15.8 |
|  | −20 | 123.8 | 55.4 | 45.4 |
|  | −30 | 471.0 | 242.4 | 168.9 |

As mentioned above, the lower viscosity provides operational advantages. For example, the present polymeric composition can be transferred from a storage container more quickly than currently available commercial products thereby reducing overall repair time.

Example 6

Figure 5:
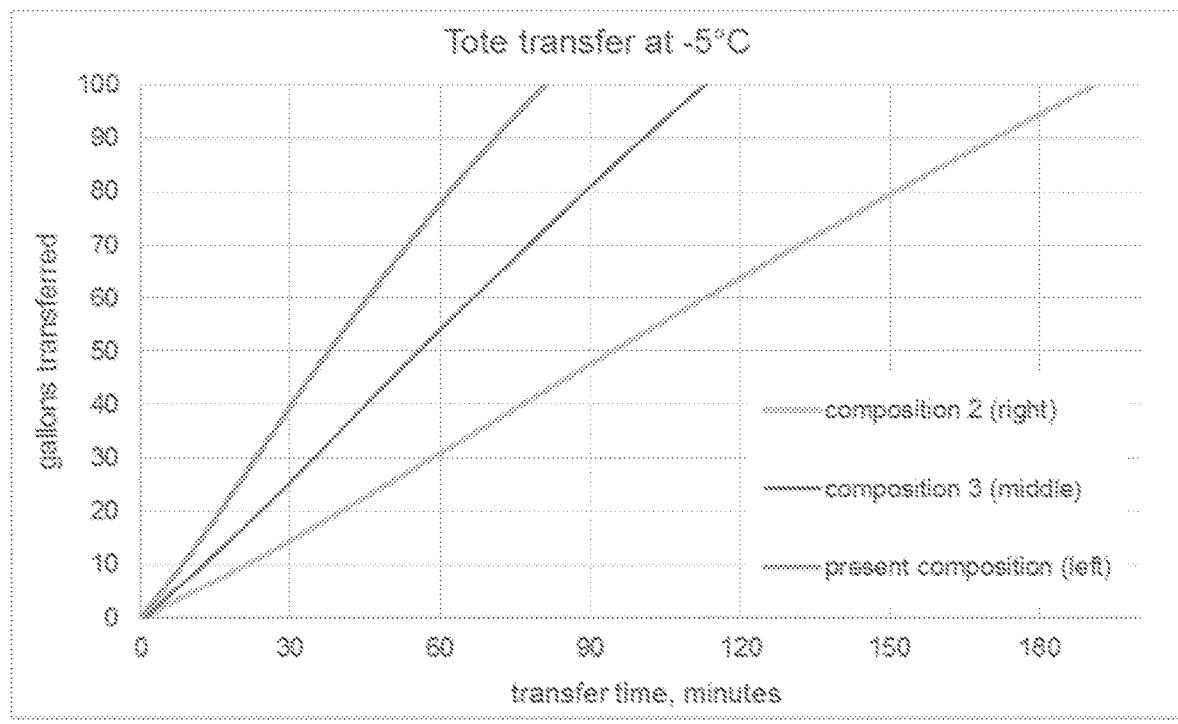
FIG. 5 is a graph showing gallons of composition transferred vs. time for an exemplary embodiment of the present polymeric plugging composition, Composition 3, and Composition 2.

Testing was performed to compare transfer time for an exemplary polymeric plugging composition as described herein to that of Composition 2 and Composition 3. Relative flowability was measured in the form of time to transfer 100 gallons of polymeric composition at approximately −5° C. from an unmixed and non-tilted (that is, level to the surface upon which it is sitting) 200 gallon stackable steel tote with a 2" diameter cam-lock outlet with ball valve, gravity only (that is, with no positive pressure or suction) for Composition 2, Composition 3, and an exemplary embodiment of the present polymeric plugging composition. The transfer time for the present composition was 81 minutes. The transfer time for Composition 3 was 113 minutes, and the transfer time for Composition 2 was 190 minutes. A graphical representation of the results is shown in FIG. 5. As shown, the transfer time using the present composition is significantly shorter than that for Composition 2 and Composition 3. A transfer rate can be determined using the measured values. For the present composition, the transfer rate was 1.25 gallons/minute (gpm). For Composition 3, the rate was 0.88 gpm, and for Composition 2, the rate was 0.53 gpm.

The lower viscosity also reduces wear of application equipment due to abrasion thereby lowering operating costs and increasing efficiency. Additionally, the polymeric composition is better able to penetrate and fill spaces and defects in the tie near the spike hole. Further, the lower viscosity reduces the temperature at which trace line heating is needed.

Example 7

Testing was performed to evaluate the moisture sensitivity of the present polymeric composition in comparison to Composition 2. The polymeric compositions were introduced into pre-drilled 2 inch holes in a wood tie that had been soaking underwater for about 15 minutes and also had a small amount of standing water in the bottom of the hole when the compositions were introduced. Moisture tolerance was measured by the amount of "posting" or "loafing" in the form of height of composition that extended above the top of the tie until the plugging composition hardened after 30 minutes of ambient cure. The less the composition interacted with moisture, the less the height of posting/loafing above the top of the tie. Thus, a shorter posting height indicates better moisture tolerance.

Figure 6:
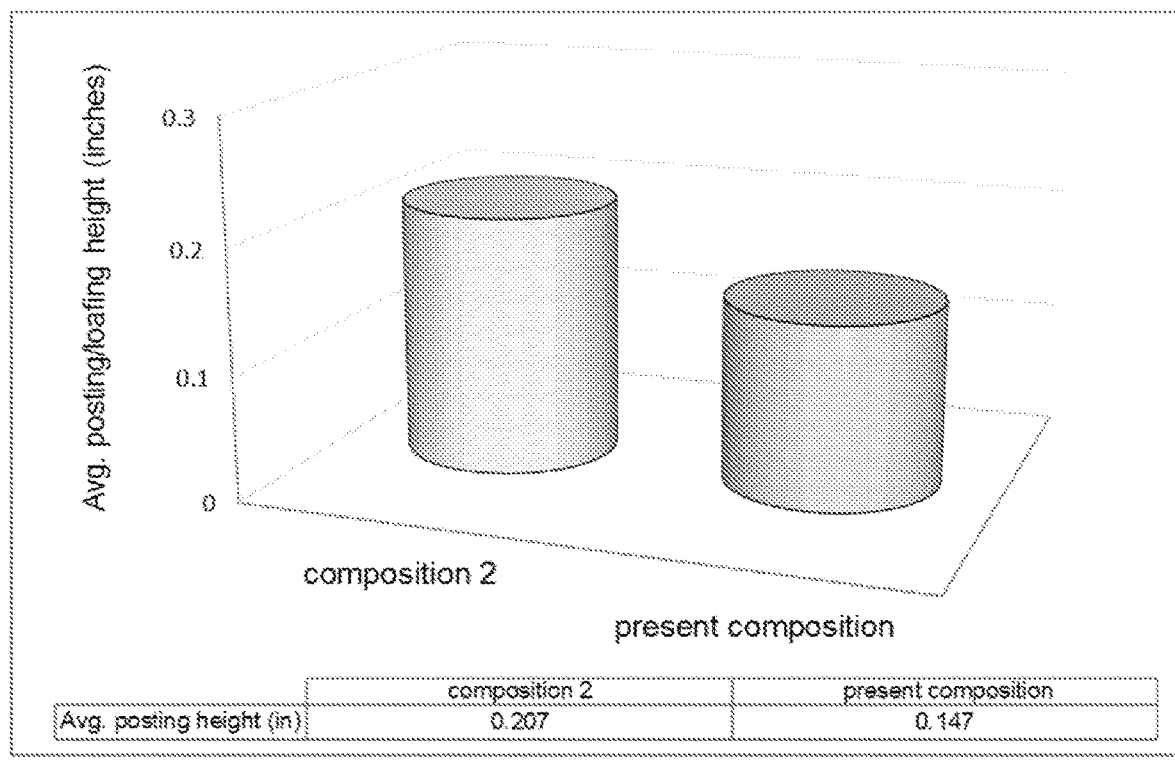
FIG. 6 is a chart showing the average posting height for Composition 2 and an exemplary embodiment of the present polymeric plugging composition.

FIG. 6 is a graphical representation showing the results of the moisture sensitivity testing. As can be seen, the present composition had a posting height of about 0.147 inches, which was less than the posting height of Composition 2 (about 0.207 inches). Thus, the present composition performed better than Composition 2.

Example 8

As described above, the present polymeric plugging composition builds physical properties faster than conventional and currently commercially available compositions. Testing was performed to compare time to hardness of the present composition to that of Composition 2 and Composition 3. Hardness was measured as a corollary to other mechanical properties using a shore D durometer. In the testing, the compositions were dispensed from cartridges into ~200 g sample cylinders and hardness was measured as the compositions cured at ambient lab conditions. The results of testing are provided in Table 7.

TABLE 7

| Composition | Overnight Shore D hardness measurement | Time to reach 75% hardness (minutes) | Time to reach 90% hardness (minutes) |
|---|---|---|---|
| Polymeric plugging composition | 75 | 24 | 40 |
| Composition 2 | 77 | 35 | 60 |
| Composition 3 | 65 | 53 | 105 |

Figure 7:
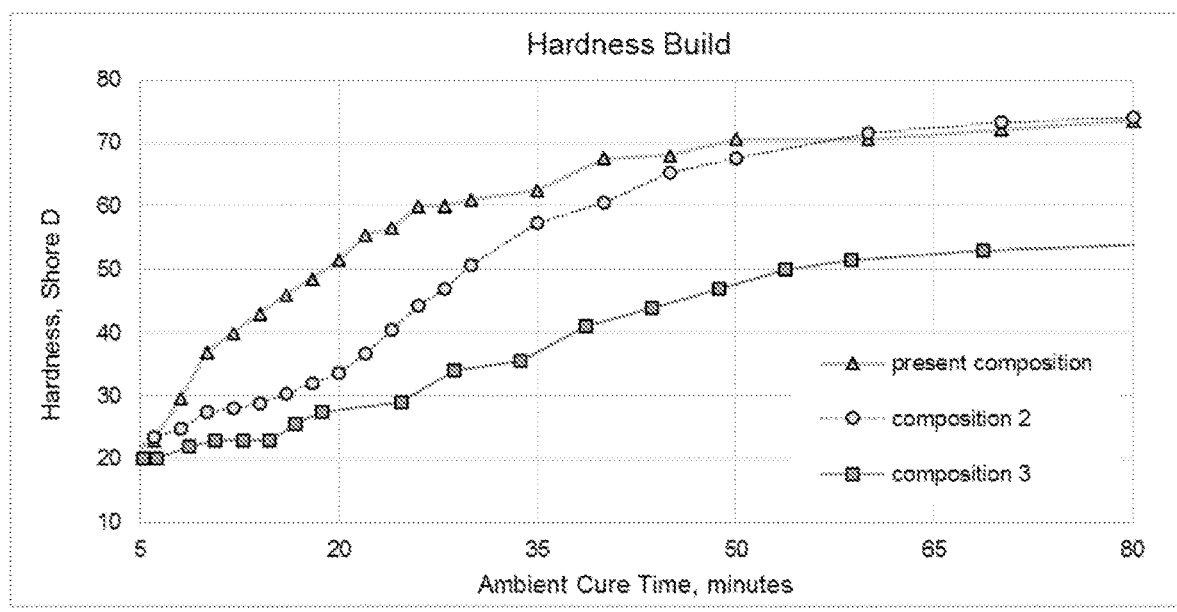
FIG. 7 is a graph showing hardness build vs. time for an exemplary embodiment of the present polymeric plugging composition, Composition 2, and Composition 3.

As shown in Table 7, the time to reach hardness for the present polymeric composition is less than that for Composition 2 and Composition 3. The hardness testing results are shown graphically in FIG. 7.

I claim:

1. A polymeric composition for restoring a previously formed spike hole in a wood railroad tie, comprising:
   a resin comprising:
      diethylene glycol in a concentration of about 10 wt % to about 15 wt %,
      0.1 wt % to 1 wt % organometallic catalyst;
      about 6 wt % to about 8 wt % moisture control additive comprising molecular sieves;
      30 wt % to 35 wt % filler; and
      about 40 wt % to about 45 wt % of a blend of polyols, the blend of polyols comprising at least one relatively lower molecular weight polyol and at least one relatively higher molecular weight polyol, and
   at least one isocyanate-containing compound,
   wherein the polymeric composition has a polyurethane index of from about 1.0 to about 1.3 and
   wherein the polymeric composition is substantially non-cellular.

2. The polymeric composition of claim 1, wherein the blend of polyols comprises a polyalcohol having at least two hydroxyl groups.

3. The polymeric composition of claim 1, wherein the blend of polyols is selected from the group consisting of polyethers, polyesteramides, polythioethers, polycarbonates, polyacetals, polyolefins, polysiloxanes, various grades of caster oils, hydroxy-terminated prepolymers and mixtures thereof.

4. The polymeric composition of claim 1, wherein the at least one isocyanate-containing compound comprises at least one isocyanate functional group selected from the group consisting of an aliphatic isocyanate, a cycloaliphatic isocyanate, an aryl isocyanate, an aromatic cyanate, and combinations thereof.

5. The polymeric composition of claim 1, wherein the polymeric composition has a spike withdrawal resistance ratio of ≥0.9, wherein the spike withdrawal resistance ratio is the maximum force required to extract a railroad spike from the polymeric composition disposed in the previously formed spike hole divided by the maximum force required to extract a railroad spike directly from the same wood railroad tie, and wherein the polymeric composition has a viscosity of ≤70 Pa*s at temperatures as low as −20° C. and a shear rate of 1/s.

6. The polymeric composition of claim 5, wherein the polymeric composition has a viscosity of ≤275 Pa*s at temperatures as low as −30° C. and a shear rate of 1/s.

7. The polymeric composition of claim 1, wherein the polymeric composition has a spike withdrawal resistance ratio of ≥0.9, wherein the spike withdrawal resistance ratio is the maximum force required to extract a railroad spike from the polymeric composition disposed in the previously formed spike hole divided by the maximum force required to extract a railroad spike directly from the same wood railroad tie, and wherein the polymeric composition has a viscosity of ≤50 Pa*s at temperatures as low as −20° C. and a shear rate of 50/s.

8. The polymeric composition of claim 7, wherein the polymeric composition has a viscosity of ≤175 Pa*s at temperatures as low as −30° C. and a shear rate of 50/s.

9. The polymeric composition of claim 1, wherein the polymeric composition has flowability at −5° C. of ≥1 gallon per minute.

10. The polymeric composition of claim 9, wherein the polymeric composition has flowability at −5° C. of ≥1.1 gallons per minute.

11. The polymeric composition of claim 1, wherein the polymeric composition attains a hardness measurement that is at least 75% of final hardness at ambient temperature in less than 30 minutes.

12. The polymeric composition of claim 11, wherein the polymeric composition attains a hardness measurement that is at least 75% of final hardness at ambient temperature at a time between 20 minutes and 30 minutes.

13. The polymeric composition of claim 11, wherein the polymeric composition attains a hardness measurement that is at least 75% of final hardness in less than 25 minutes.

14. The polymeric composition of claim 11, wherein the polymeric composition attains a hardness measurement that is at least 90% of final hardness at ambient temperature at a time between 30 minutes and 50 minutes.

15. The polymeric composition of claim 11, wherein the polymeric composition attains a hardness measurement that is at least 90% of final hardness at ambient temperature in less than 50 minutes.

16. The polymeric composition of claim 11, wherein the polymeric composition attains a hardness measurement that is at least 90% of final hardness at ambient temperature in less than 45 minutes.

* * * * *